(12) United States Patent
Kweon

(10) Patent No.: US 6,846,394 B2
(45) Date of Patent: Jan. 25, 2005

(54) ELECTROLYTIC BATH EQUIPPED WITH A WATERWAY CONVERTER FOR IONIZED WATER PRODUCER

(75) Inventor: Soon Sun Kweon, Kyungki-do (KR)

(73) Assignee: Dong Yang Science Co., Ltd., Kyungki-do (KR)

(*) Notice: Subject to any disclaimer, the term of this patent is extended or adjusted under 35 U.S.C. 154(b) by 168 days.

(21) Appl. No.: 10/274,959

(22) Filed: Oct. 22, 2002

(65) Prior Publication Data
US 2003/0173212 A1 Sep. 18, 2003

(30) Foreign Application Priority Data
Mar. 12, 2002 (KR) .......................... 2002-13108

(51) Int. Cl.⁷ .............................................. C25B 9/00
(52) U.S. Cl. ..................................................... 204/275.1
(58) Field of Search ...................................... 204/275.1

(56) References Cited

U.S. PATENT DOCUMENTS 4,289,599 A * 9/1981 Fushihara .................. 204/240
5,496,860 A    3/1996 Matsumoto et al.
5,846,390 A   12/1998 Eki et al.
5,865,966 A    2/1999 Watanabe et al.

* cited by examiner

Primary Examiner—Donald R. Valentine
(74) Attorney, Agent, or Firm—Volentine Francos & Whitt, PLLC

(57) ABSTRACT

An electrolytic bath has a waterway converter that allows the ionized water outlets to discharge the same species of ionized water even if the polarity of the produced ionized water at the polar chamber has been reversed in order to prohibit the formation of the scale at the electrode. The waterway converter includes a cylinder-shaped valve housing and a cylindrical-bar shaped valve body wherein the valve body is rotated in accordance with the inversion of polarity at the chamber in such a way that the central linking pipe and linking pipe are alternatively linked to the alkaline and acid ionized water outlets.

2 Claims, 8 Drawing Sheets

ELECTROLYTIC BATH EQUIPPED WITH A WATERWAY CONVERTER FOR IONIZED WATER PRODUCER

CROSS-REFERENCES TO RELATED APPLICATIONS

This application relies for priority upon Korean Patent Application No. 2002-0013108, filed on Mar. 12, 2002, the contents of which are hereby incorporated by reference herein in their entirety as if fully set forth herein.

1. Technical Field

The present invention relates to an electrolytic bath equipped with a waterway converter for an ionized water producer, and more particularly to an electrolytic bath with a waterway converter which makes it possible for an outlet (or the faucet) of the ionized water producer to discharge consistently the same species of ionized water, i.e. either alkaline or acid ionized water, even when the polarity of the ionized water at the polar chamber of the electrolytic bath has been switched for the prevention of the formation of scale at the electrode.

2. Description of the Related Art

Generally one of the causes of modern adult diseases like hypertension, diabetes, and heart disease is the acidification of physical constitution due to an excessive intake of acidic food.

An ionized water producer has been developed in an effort to convert the physical constitution into the light-alkaline type.

FIG. 1 is a schematic diagram illustrating the principle of the traditional ionized water producer wherein the ionized water producer comprises a purifier 1 for the filtration of water and an electrolytic bath 2 for dissociating the purified water in an electrolytic manner.

More specifically, the electrolytic bath 2 has a barrier rib 3 for separating the cation chamber 4 from the anion chamber 5, and both acid ionized water and alkaline ionized water are produced during the electrolysis process of the purified water with proper polarity of voltages applied at each chamber.

When voltage is applied at the positive electrode of the cation chamber 4, oxygen gas is generated and the hydroxy ion in the chamber is consumed during the reduction process of the hydroxy ion in the electrolyzed water. During the above-mentioned reduction process, negative ions including chlorine, phosphorus, and sulfur, form acids and the water in the cation chamber 4 is thereby acidified.

At the anion chamber 5, on the other hand, hydrogen gas is generated due to the reduction process of hydrogen. In this case, positive ionic pairs are formed by positive ions such as sodium, magnesium, and calcium.

Consequently, the solution at the anion chamber 5 becomes alkaline. The alkaline ionized water produced at the anion chamber 5 can be used for drinking water while the acid ionized water can be used for skin care or sterilization.

Furthermore, the structure of the alkaline ionized water becomes hexagonal during the electrolysis, which turns out to be an outstanding feature for the maintenance of a sound body.

However, the prior art has a shortcoming because the cations like calcium and magnesium are solidified at the negative electrodes of the anion chamber 5 during the electrolysis.

As time passes, the amount of the solidified tartar, as it were, or scale at the negative electrodes becomes great enough to cause a decrease of the electric current during electrolysis. The excessive build-up of scale at the negative electrode will decrease the electric current and thereby deteriorates the efficiency in the dissociation of water during the electrolysis process.

Since the scale or tartar is inevitably formed at the negative electrode, it is necessary to switch the polarity of the electrode periodically in order to prevent the deterioration of the electrolysis efficiency.

Consequently, the state of the art in the field of ionized water generation is that the polarity of voltage applied at the electrodes of each chamber is switched from time to time for preventing the formation of scale at the negative electrode.

a. In this approach, the role of each electrode is periodically commutated in an effort to effectively prevent the formation of scale at the electrode of the anion chamber. In other words, the cation and anion chambers are switched with each other periodically.

b. Since the roles of the cation chamber and the anion chamber are interchanged from time to time in accordance with the prior art, the species of the ionized water, namely either alkaline ionized water or acid ionized water, discharged at the outlets or the faucets, should be alternatively changing accordingly.

c. Referring to FIG. 1 again, the species of ionized water flowing through the transfer routes 6 and 7 are kept unchanged even when the polarity of ionized water is switched because a switching valve installed at the transfer routes switches the directional flow of the ionized water such that the species of ionized water at the outlet is kept constant.

SUMMARY

In view of these problems, there is a need in the art for an electrolytic bath having a waterway converter for alternating the transfer routes of ionized water in such a way that the species (either alkaline or acid) of ionized water flowing out of an outlet should be kept the same even if the polarity of the applied voltage at the polar chambers of the electrolytic bath have been changed over for the prevention of the formation of scale at the electrode(s).

Accordingly, it is an object of the present invention to provide a switching converter, which enables an outlet to discharge the same kind (either alkaline or acid) of ionized water despite the polar conversion at the electrodes in the electrolyzer for the prevention of the formation of scale at the negative electrodes.

In accordance with a broad aspect of the present invention, provided is a waterway converter installed at a part of an electrolytic bath, comprising a cylindrical valve housing for accommodating a valve body with a cylindrical shape attached with a bar at the end. At the valve housing is provided an isolation wall all over the bottom plane and side plane of the cylinder.

Beneficially, both a central inlet and a side inlet are formed at the circular bottom plane of the isolation wall for alternatively linking to the ionized water pipe lines and from the electrolytic bath such that the central inlet is aligned with the axis of the cylindrical valve housing, while the alkaline water outlet and the acid water outlet are formed at the side plane of the cylinder-shaped isolation wall such that both outlets are aligned along a line that is perpendicular to the axis of the cylindrical valve housing.

Beneficially, a central linking pipe is formed at the an end of the valve body, which is the contacting interface with the isolation wall, such that the central pipe is protruded outwardly from the inside, while a ring-type waterway is formed along the periphery of the central linking pipe at the valve body such that the rotational axis of the ring-type waterway is aligned with the axis of the cylindrical valve body.

Also beneficially, each from the group of the central linking pipe and the ring-type waterway is alternatively coupled to each from the group of a central linking hole in the shape of a " " and a linking hole in order to set up the ionized water transfer routes from the ionized water inlets to the outlets.

As a preferred embodiment in accordance with the present invention, the alternative switching between the outlets and the linking holes can be accomplished by the rotation of the valve body in the valve housing with a step motor.

As a result, it becomes possible to prevent the inversion of the polarity of the ionized water discharging at an outlet even if the polarity of the produced ionized water is inverted in the polar chamber.

BRIEF DESCRIPTION OF THE DRAWINGS

Further features of the present invention will become apparent from a description of the present invention in conjunction with the accompanying drawings of the preferred embodiment of the invention, which, however, should not be taken to limit the invention, but are for explanation and understanding only.

In the drawings.

DETAILED DESCRIPTION

Figure 1:
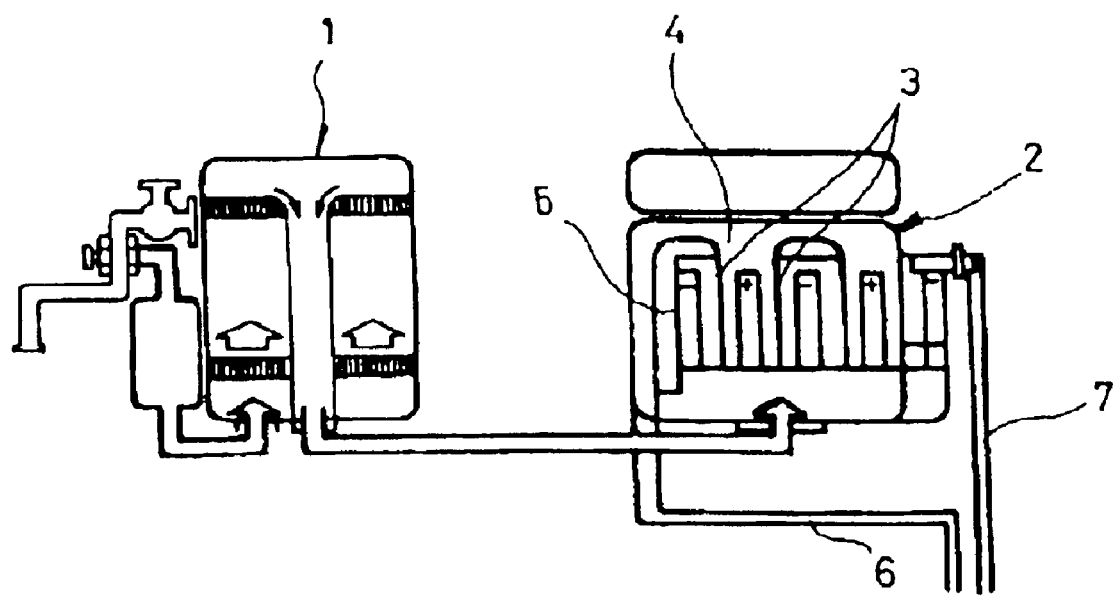
FIG. 1 is a schematic diagram illustrating an ionized water producer in accordance with the prior art.
Figure 2:
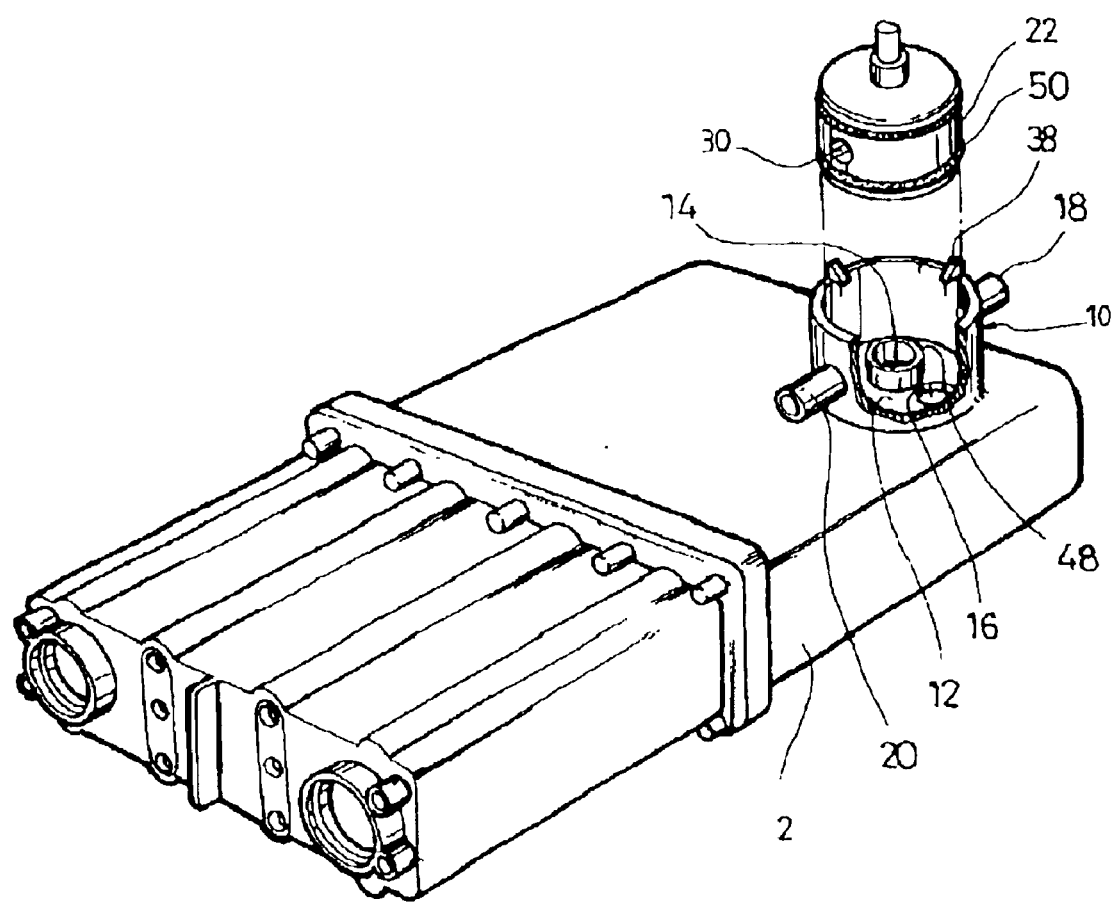
FIG. 2 is a schematic diagram illustrating the constitution of the main part of the converter in accordance with the present invention.

The present invention will be explained in detail with reference to the accompanying drawings. FIG. 2 shows a schematic diagram illustrating the constitution of the main part of an embodiment of a waterway converter in accordance with one or more aspects of the present invention.

The embodiment shown in FIG. 2 includes a cylindrical valve housing 10 and a valve body 22 having a cylindrical shape attached with a bar at an end for rotating the valve body 22 with a step motor, for example.

The cylindrical valve housing 10 is implemented as a single unit integrated together with the electrolytic bath 2. At the vertical border of the valve housing 10 where it joins the electrolytic bath 2 is formed an isolation wall 12 where a central inlet 14 and a side inlet 16 are formed for the link to the ionized water lines 34 and 36 from the electrolytic bath 2.

At the surface of the outer circumference of the cylindrical valve housing 10 are formed both an outlet 18 for acidic water and an outlet 20 for alkaline water, wherein the one outlet is located in the opposite direction to the other outlet in such a way that both outlets are located along a line that is perpendicular to the rotational axis of the valve body 22.

At the bottom plane of the cylindrical valve body 22, which is in contact with the isolation wall 12 of the valve housing 10, there is formed a central linking pipe 24 in such a way that it protrudes outwardly from the inside of the valve body. A ring-type waterway 26 is formed around the central linking pipe 24. The central linking pipe 24 and the ring-type waterway 26 are respectively coupled to a central linking hole 28 and a linking hole 30, formed in the valve body 22 in the shape of a "⊓".

As the polarity of the ionized water is switched at the electrolytic bath, the coupling between the outlets 18, 20 and the linking holes 28, 30 is switched accordingly through the rotation of the valve body 22.

Therefore, the species of the ionized water at the outlets 18, 20 are kept consistent irrespective of the change over or switching of the electrical polarity at the electrolytic bath.

The waterway converter is prepared with alternating transfer routes in the valve body 22 through the rotation for the link to the pipelines 34, 36 of the ionized water in the electrolytic bath. Furthermore, the waterway is switched over when the electrical polarity at the electrolytic bath is converted.

In order to switch a waterway route in accordance with the periodic switching of the polar chamber, there are provided a valve housing 10 and a valve body 22 that is designed to be accommodated in the valve housing 10. Beneficially, the valve housing 10 is molded with the electrolytic bath 2 as a single unit.

Figure 3:
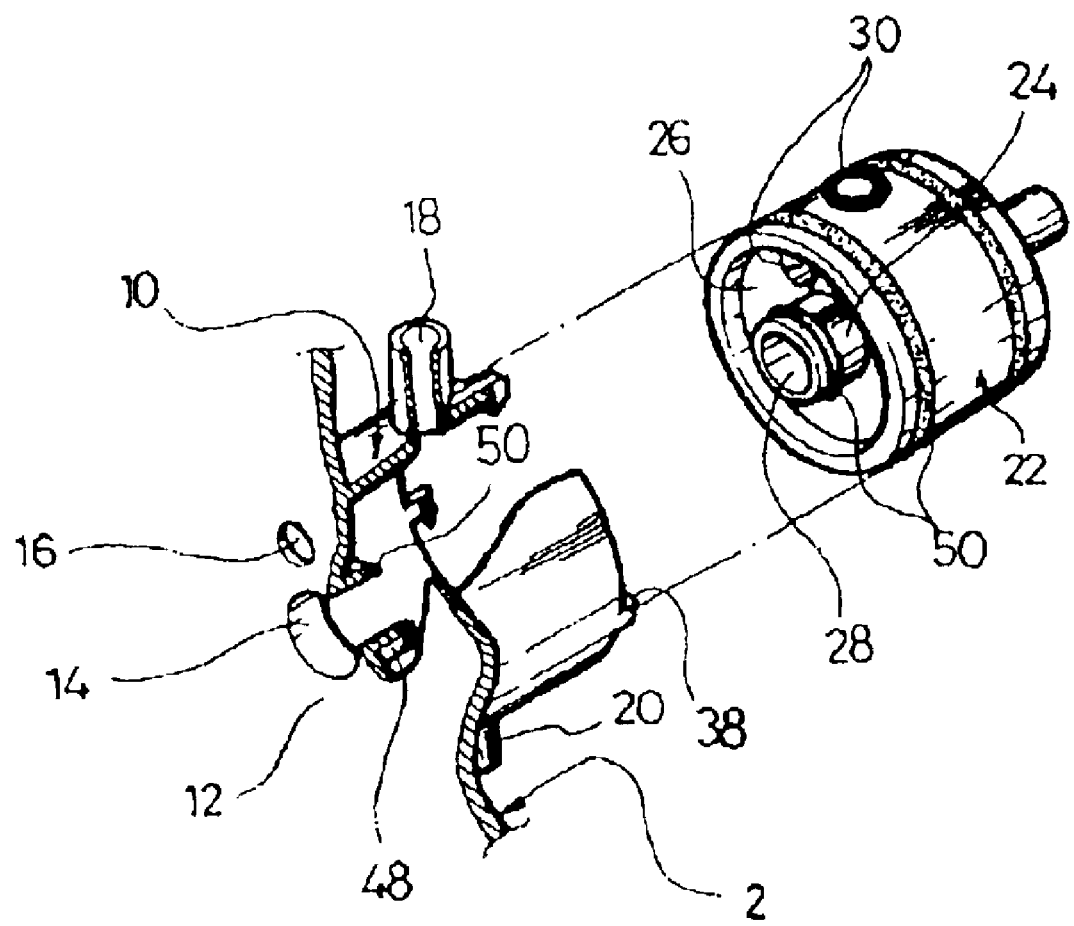
FIG. 3 is a schematic diagram illustrating the functional parts of the ionized water producer in accordance with the present invention.
Figure 4A:
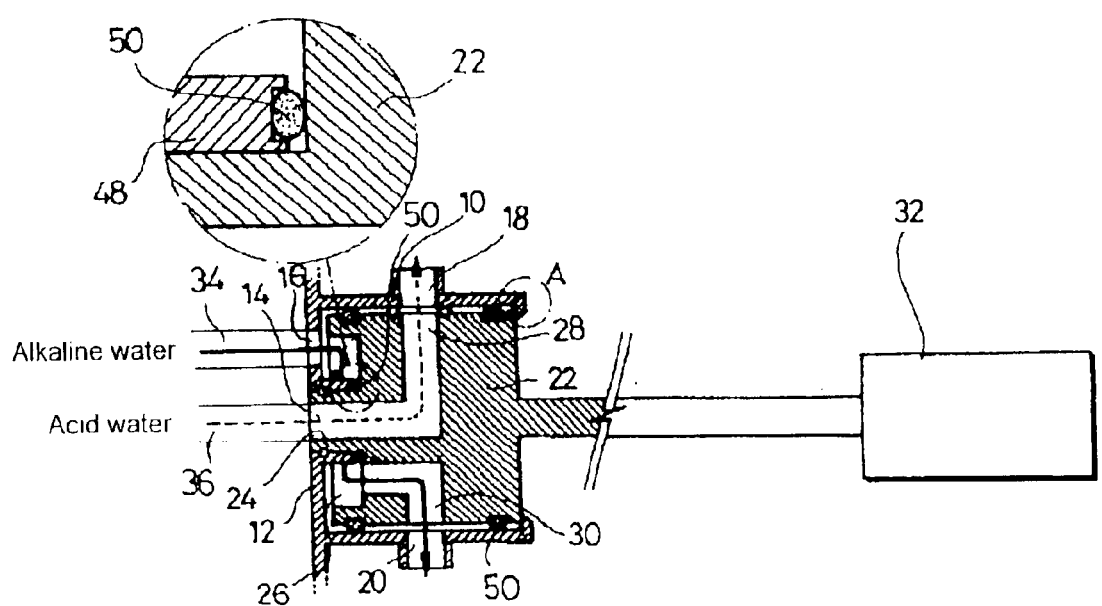
FIG. 4A is a cross-sectional diagram illustrating the transfer routes for both alkaline and acid ionized water in the converter in accordance with the present invention.
Figure 4B:
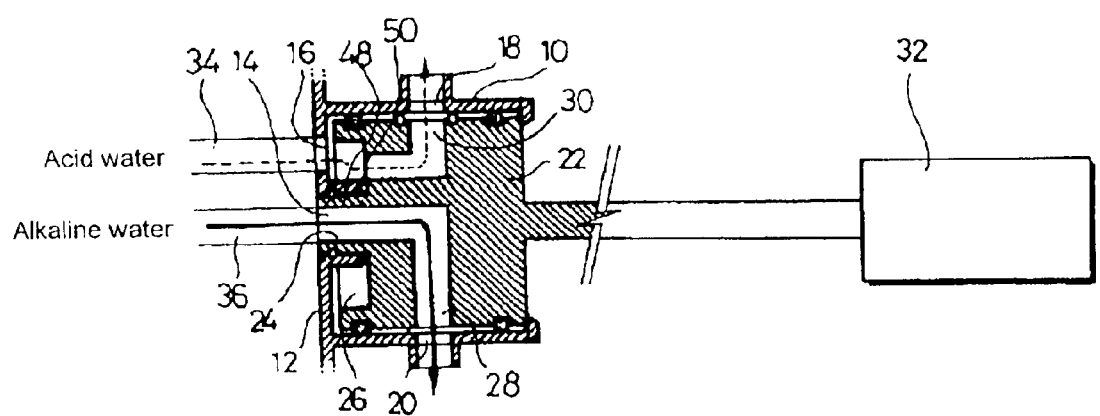
FIG. 4B is a cross-sectional diagram illustrating the transfer routes for ionized water in the converter when the polarity of ionized water has been changed over in accordance with the present invention.

Since the cylinder-bar shaped valve body 22 is rotated 180° in the cylindrical valve housing 10 as depicted in FIGS. 3 and 4A–B, the waterway route can be alternatively switched.

At the front-end is implemented an isolation wall 12 where both a central inlet 14 and a side inlet 16 are formed in such a way that they are linked to ionic water pipe lines 34 and 36.

The central inlet 14 and the side inlet 16 are independently linked to the ionic water pipe lines 34 and 36. Now, the central inlet 14 and the side inlet 16 are linked to the central linking pipe 24 and the ring-type waterway 26, respectively, and thereby a couple of ionized water transfer routes (for both alkaline and acid) are formed separately.

More specifically, since the central linking pipe 24 is formed in such a way that it is protruded outwardly from the inside at the bottom plane of the valve body 22, the protruded part with a shape of circular ring forms the ring-type waterway 26 that is to be linked to the side inlet 16.

Consequently, a couple of independent waterways are guaranteed between the valve housing 10 and the valve body 22. Further, a central linking hole 28 and a linking hole 30 linked to the ring-type waterway 26 are formed inside of the valve body 22 in such a manner that they are located in opposite directions (along a line on the vertical cross section) and coupled to the acid water outlet 18 and the alkaline water outlet 20 of the valve housing 10.

As a consequence of the 180° rotation of the valve body 22 in the valve housing 10, the coupling between the linking holes 28, 30 and the outlets 18, 20 is alternatively switched over, and thereby the species of ionized water flowing out of the outlets 18, 20 are maintained the same.

Beneficially, the 180° rotation of the valve body 22 can be accomplished with a step motor 32 that is controlled by a controller such that it is rotated in accordance with the switching of the polarity of the polar chambers in the electrolytic bath 2.

Preferably, the electrical configuration for the switching of the controller simultaneously with the polar chambers can be designed such that the polarity should be switched every time when the ionized water is withdrawn.

Since the waterway is switched through the rotation at the interface between the cylindrical bar-shaped valve body 22 and the cylindrical valve housing 10, packing 50 is preferably installed at the joint between the valve body 22 and the valve housing 10 to improve the water-tightness.

In order to improve the water-tightness between the inner circumference of the valve housing 10 and the outer circumference of the valve body 22, packing can be implemented at the outer circumference of the valve body 22.

Beneficially, a sustaining pipe 48, which is linked to the inside of the valve, is formed at the central inlet 14 for improving the water-tightness of the waterway constituted through the link between the valve housing 10 and the valve body 22, and packing 50 is preferably installed in-between the sustaining pipe 48 and the central linking pipe 24.

Figure 5:
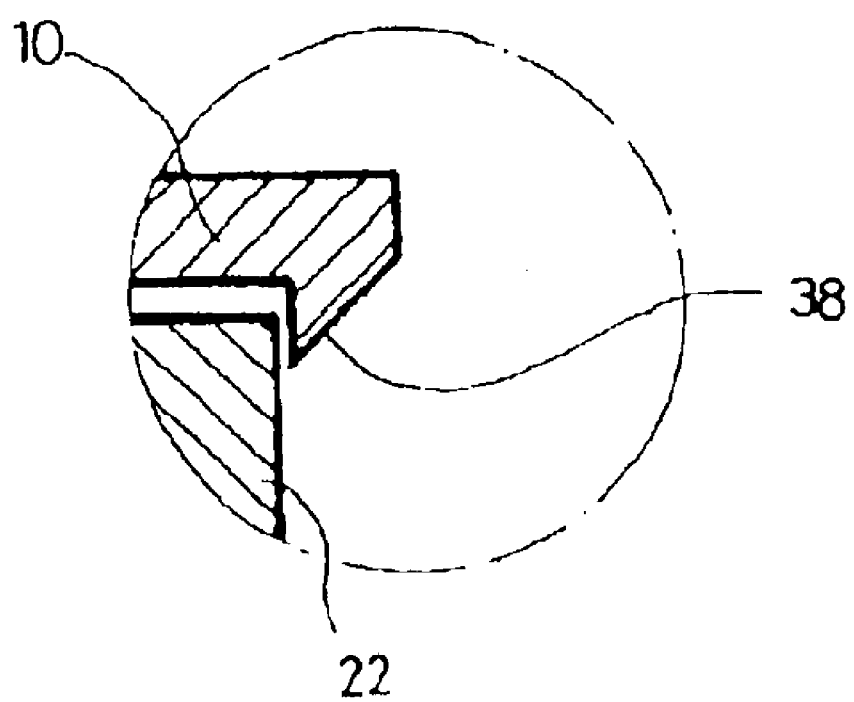
FIG. 5 is a schematic diagram illustrating the magnified view of the part A depicted in FIG. 3.

Further, as a fixing means for installing the valve body 22 inside the valve housing 10, an insertion sill 38, which has an incline, is formed at the end of the opening part of the valve housing 10 as shown in FIG. 5.

Now, when the valve body 22 is inserted in the valve housing 10, the insertion sill 38 fixes the rear end of the valve body 22 lest the valve body 22 should be inadvertently withdrawn from the valve housing 10.

The operating mechanism of the waterway converter, as shown in FIGS. 4A and 4B, makes it possible for one species of the in-flowing ionized water to be linked to the central inlet 14 while the other species of the in-flowing ionized water is coupled to the side inlet 16.

The ionized water (acid ionized water) entering the central inlet 14 flows out to the acid ionized water outlet 18 through the waterway formed by the central linking pipe 24, i.e., the central linking hole 28, while the other type of ionized water (alkaline ionized water), entering the side inlet 16, is discharged to the alkaline ionized water outlet 18 through the ring-type waterway 26 and the linking hole 30 linked to the ring-type waterway.

Now, if the polarity of the ionized water flowing into the ionized water lines 34, 36 is switched due to the change-over of the polarity of electrolytic bath 2, the polarity of the inflowing ionized water through the central inlet 14 and the side inlet 16 is also switched.

Simultaneously, the valve body 22 experiences the 180° rotation due to the operation of the step motor 32, and the coupling position between the linking holes 28, 30 and the outlets 18, 20, is switched as shown in FIG. 4B.

Consequently, the ionized water flowing into the central inlet 14 and the side inlet 16 is discharged now through the opposite discharging pipe. Thus, a reversal or inversion of the polarity of the ionized water out the outlet 18 and 20 never occurs even when the species of the ionized water in the ionized water lines 34 and 36 are inverted.

Figure 6:
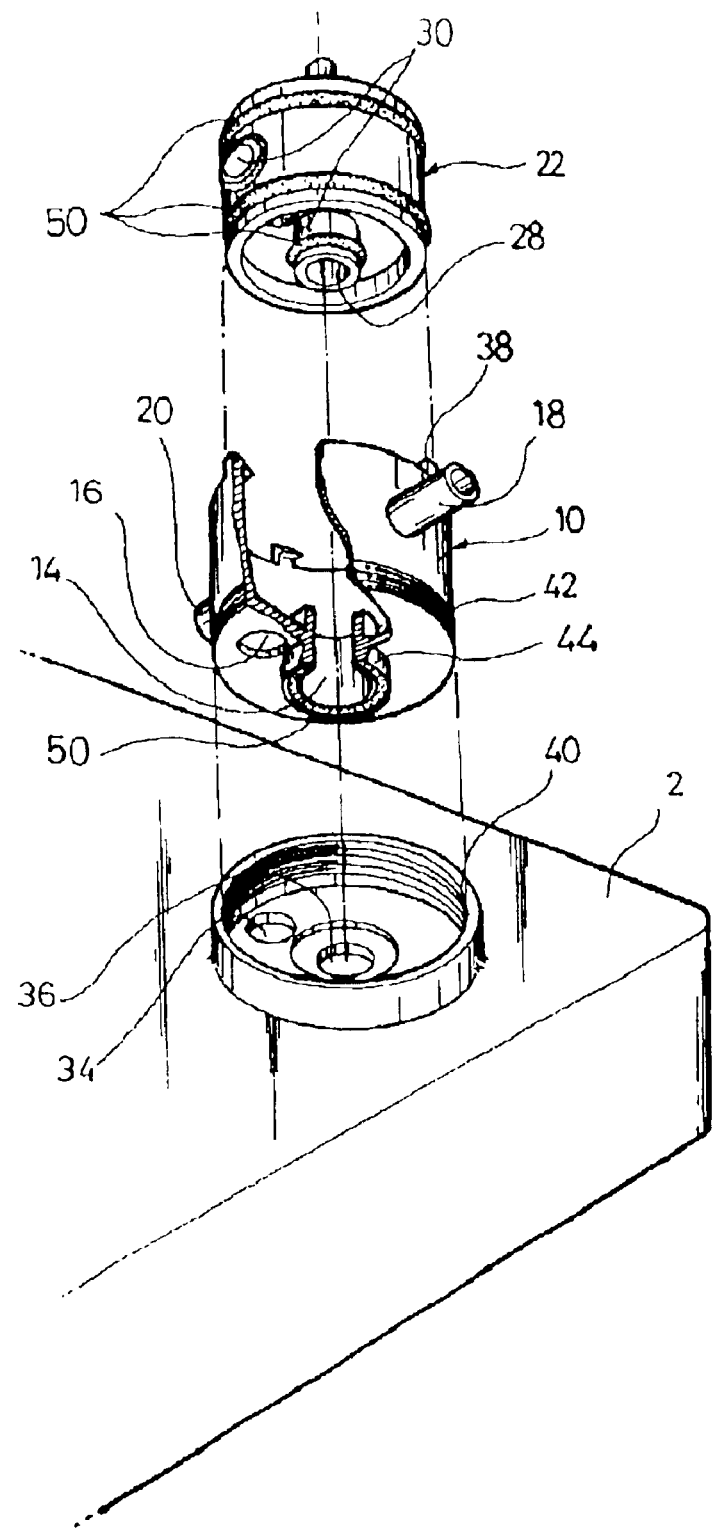
FIG. 6 is a schematic diagram illustrating another embodiment of the ionized water producer in accordance with the present invention.
Figure 7:
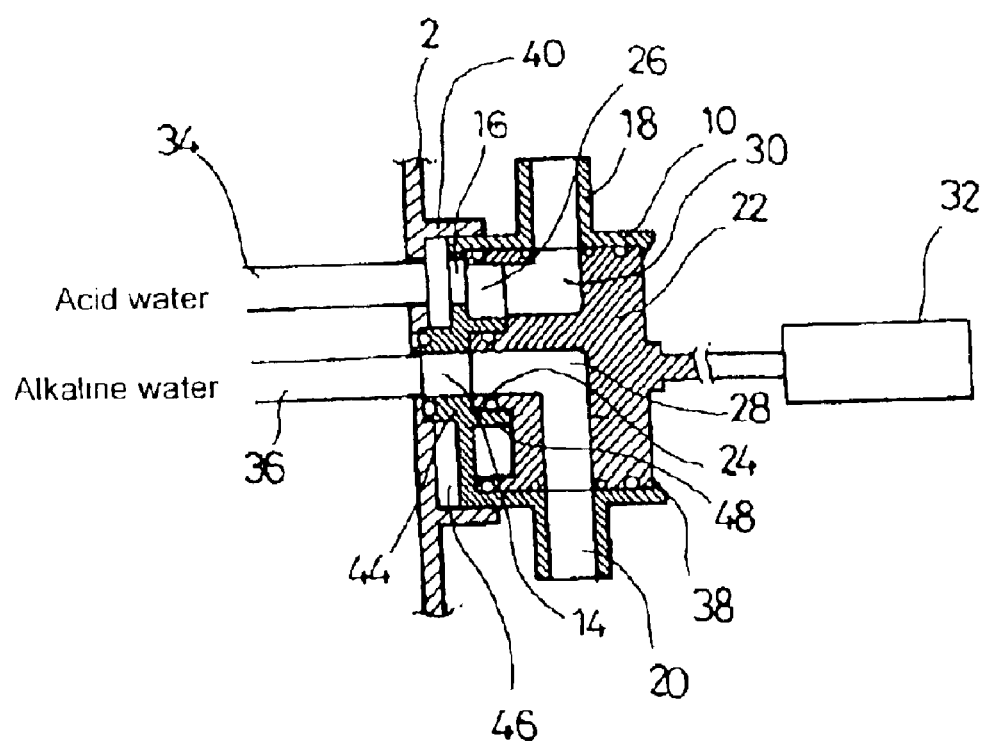
FIG. 7 is a cross-sectional diagram illustrating the ionized water producer when the converter depicted in FIG. 6 is implemented.

FIGS. 6 and 7 are schematic diagrams illustrating a "bird's eye" view and vertical cross sectional view, respectively, of another embodiment of an ion water producer.

A threaded holding ring 40, which forms a single body with the electrolytic bath 2, is implemented in such a fashion that the valve housing 10 is removable from the electrolytic bath 2. The threaded line 42, which is operationally coupled with the threaded holding ring 40, is formed at the outer circumference of the front-end of the valve housing 10.

The ionized water lines 34 and 36 pass through the sidewall of the electrolytic bath and are linked to the central inlet 14 and the side inlet 16 of the valve housing 10. Beneficially, a part including the central inlet 14 protrudes toward the threaded holding ring 40 and an extension-upholding pipe 44 is formed.

When the valve housing 10 is fitted to the threaded holding ring 40, the protruding extension-upholding pipe 44 forms a linking waterway 46 between the threaded holding ring 40 and the isolation wall 12.

The linking waterway 46 operates as a link between an ionized water line 34 and the side inlet 16. More specifically, since the central inlet 14 is located at the center of rotation, the central inlet is coupled to one ionized water line 36 when the valve housing 10 is screw-jointed with the electrolytic bath 2.

In the meanwhile, a separate linking waterway 46 is provided since the side inlet 16 cannot be linked to the other ionized water line 34 due to the eccentricity.

In the following, the detailed description regarding the constitution and operation shall be omitted since the details have been mentioned with reference to FIGS. 2 through to 4. In this embodiment, it is possible to replace the valve housing 10 with a new one since the valve housing 10 is removable from the electrolytic bath 2. Such a feature is beneficial, for example, if the water-tightness becomes poor due to the erosion of the packing 50 installed at the valve body 22.

Preferably, the driving force for rotating the valve body 22 can be generated by the step motor 32 for the convenience of the user. As another embodiment, the valve body 22 can be rotated manually.

More preferably, the valve body 22 can be manually rotated through implementing a knob along the rotating axis. The driving axis of the valve body 22 is extended such that the end part is located at the front of the ionized water producer. Further, the rotating knob, which is operated as an on/off switch for discharging ionized water, is installed at the extended end part.

When the rotating knob is used, the polarity of the electrolytic bath 2 is inverted with respect to the valve body 22 being rotated. As a consequence, the polarity of the ionized water at each outlet is kept constant without inversion.

Although the invention has been illustrated and described with respect to exemplary embodiments thereof, it should be understood by those skilled in the art that various other changes, omissions and additions may be made therein and thereto, without departing from the spirit and scope of the present invention.

Therefore, the present invention should not be understood as limited to the specific embodiment set forth above but to include all possible embodiments which can be embodied within a scope encompassed and equivalents thereof with respect to the features set forth in the appended claims.

What is claimed is:

1. A waterway converter for an electrolytic bath of an ionized water producer, comprising:

a valve housing having a cylindrical shape, integrated as a single body with the electrolytic bath, said housing including, an isolation wall on which a central inlet and a side inlet are formed at an end for a link to ionized water lines in the electrolytic bath, and both an acidic ionized water outlet and an alkaline ionized water outlet formed on a surface of the outer circumference of the valve housing; and a valve body, rotating in said valve housing, the valve body including a central linking pipe formed at an end such that it is in contact with said isolation wall of said valve housing and it is outwardly protruded from inside the valve body, forming a ring-type waterway, said central linking pipe and said ring-type waterway being respectively linked to a central linking hole having a bent shape and a side linking hole provided in said valve body, and said acidic and alkaline ionized water outlets are alternately switched to be linked to the central linking hole and the side linking hole when the valve body is rotated, wherein said outlets of said valve housing are located along a line that is perpendicular to a rotational axis of the valve body.

2. The waterway converter as set forth in claim 1, wherein said valve housing has a removable threaded holding ring on a wall of said electrolytic bath, and a threaded line is formed on the outer circumference of a front end of the valve housing, the ionized water lines being formed on side walls of the electrolytic bath and a protruding extension-upholding pipe being formed at the central inlet of said isolation wall to be linked to one of the ionized water lines, and another of the ionized water lines being linked to the side inlet and the sidelinking hole and forming a waterway through said protruding extension upholding pipe, said threaded holding ring, and said isolation wall.

* * * * *